(12) United States Patent
Kim

(10) Patent No.: US 7,724,325 B2
(45) Date of Patent: May 25, 2010

(54) LIQUID CRYSTAL DISPLAY DEVICE AND METHOD FOR MANUFACTURING THE SAME

(75) Inventor: Woo Hyun Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 10/875,577

(22) Filed: Jun. 25, 2004

(65) Prior Publication Data

US 2004/0263752 A1     Dec. 30, 2004

(30) Foreign Application Priority Data

Jun. 28, 2003    (KR) .................. 10-2003-0042963

(51) Int. Cl.
     *G02F 1/1335*    (2006.01)
(52) U.S. Cl. .................. 349/108; 349/106; 349/109
(58) Field of Classification Search ............... 349/141
     See application file for complete search history.

(56) References Cited

U.S. PATENT DOCUMENTS

| | | | | |
|---|---|---|---|---|
| 4,470,667 | A * | 9/1984 | Okubo et al. ........... | 349/42 |
| 5,648,861 | A * | 7/1997 | Natsuhori ............... | 349/116 |
| 6,639,640 | B1 * | 10/2003 | Matsuoka et al. ....... | 349/139 |
| 2002/0159016 | A1 * | 10/2002 | Nishida et al. .......... | 349/141 |
| 2006/0152655 | A1 * | 7/2006 | Kim ....................... | 349/110 |

FOREIGN PATENT DOCUMENTS

| | | |
|---|---|---|
| KR | 2000-57973 | 9/2000 |
| KR | 2002-69168 | 8/2002 |

\* cited by examiner

*Primary Examiner*—David Nelms
*Assistant Examiner*—Lucy P Chien
(74) *Attorney, Agent, or Firm*—McKenna Long & Aldridgi LLP

(57) ABSTRACT

An in-plane switching (IPS) mode liquid crystal display (LCD) device having a color filter on TFT (COT) structure therein and a method for manufacturing the same is disclosed to improve picture quality by decreasing the reflection of external light above the data line, to obtain the economic efficiency, simplify the manufacturing process by forming a light-shielding layer of a metal material, and to solve the problem of decreasing aperture ratio after bonding lower and upper substrates to each other. The device includes first and second substrates facing each other, gate and data lines crossing each other on the first substrate to define a pixel region, a first common line parallel to the gate line, a thin film transistor at a crossing portion of the gate and data lines, an insulating interlayer on an entire surface of the first substrate including the data line, color filters in the pixel region, wherein at least one of the color filters completely covers the data line, a planarization layer on the entire surface of the first substrate including the color filter layers, a second common line along the gate line and the thin film transistor; common electrodes completely overlapping the data line, and arranged at one direction in the pixel region, and a pixel electrode in contact with a drain electrode of the thin film transistor and formed between the common electrodes at fixed intervals.

16 Claims, 17 Drawing Sheets

LIQUID CRYSTAL DISPLAY DEVICE AND METHOD FOR MANUFACTURING THE SAME

This application claims the benefit of Korean Application No. P2003-42963, filed on Jun. 28, 2003, which is hereby incorporated by reference for all purposes as if fully set forth herein.

BACKGROUND OF THE INVENTION

1. Field of the Invention

The present invention relates to a liquid crystal display (LCD) device. More particularly, the present invention relates to a liquid crystal display (LCD) device and a method for manufacturing the same that improve picture quality by decreasing the reflection of external light.

2. Discussion of the Related Art

With development of an information society, demands for various display devices have increased. As a result, efforts have been made to research and develop flat display devices such as liquid crystal display (LCD), plasma display panel (PDP), electroluminescent display (ELD), and vacuum fluorescent display (VFD). Some types of flat display devices have already been applied to displays for various equipment. Among these flat display devices, liquid crystal display (LCD) devices have been most widely used because of its advantageous characteristics such as having a thin profile, light weight, and low power consumption. The LCD devices provide a substitute for a Cathode Ray Tube (CRT). In addition to mobile type LCD devices such as a display for a notebook computer, LCD devices have been developed for computer monitors and televisions to receive and display broadcast signals. Despite the various technical developments in LCD technology having applications in different fields, research in enhancing the picture quality of the LCD device has, in some respects, lacked as compared to other features and advantages of the LCD device. In order to use LCD devices in various fields as a general display, the key to developing LCD devices depends on whether the LCD devices can provide a high quality picture, such as high resolution and high luminance with a large-sized screen, while still maintaining its light weight, thin profile, and low power consumption.

In general, the LCD device includes an LCD panel for displaying a picture image, and a driving part for applying a driving signal to the LCD panel. The LCD panel includes first and second glass substrates bonded to each other at a predetermined interval, and a liquid crystal layer injected between the first and second glass substrates. The first glass substrate (also called a TFT array substrate) includes a plurality of gate and data lines, a plurality of pixel electrodes, and a plurality of thin film transistors. The plurality of gate lines are formed on the first glass substrate at fixed intervals in one direction, and the plurality of data lines are formed at fixed intervals perpendicular to the plurality of gate lines. The plurality of pixel electrodes are respectively formed in a matrix configuration in pixel regions defined by the plurality of gate and data lines crossing each other. The plurality of thin film transistors are switched on/off according to signals of the gate lines for transmitting signals of the data lines to the respective pixel electrodes. The second glass substrate (also called a color filter substrate) includes a black matrix layer that excludes light from regions except the pixel regions of the first substrate, an R/G/B color filter layer displaying various colors, and a common electrode to obtain the picture image. In the case of an IPS mode LCD device, the common electrode is formed on the first glass substrate. A predetermined space is maintained between the first and second glass substrates by spacers, and the first and second substrates are bonded to each other by a sealant pattern having a liquid crystal injection inlet. The liquid crystal layer is formed using a liquid crystal injection method, in which the liquid crystal injection inlet is dipped into a container having a liquid crystal material while maintaining a vacuum state in the predetermined space between the first and second glass substrates. That is, the liquid crystal material is injected between the first and second substrates by an osmotic action. Then, the liquid crystal injection inlet is sealed with a sealant.

The LCD device is driven according to optical anisotropy and polarizability of liquid crystal. Liquid crystal molecules are aligned using directional characteristics because the liquid crystal molecules each have long and thin shapes. In this respect, an electric field is applied to the liquid crystal to control the alignment direction of the liquid crystal molecules. If the alignment direction of the liquid crystal molecules is controlled by the electric field, the light is polarized and changed by the optical anisotropy of the liquid crystal, thereby displaying the picture image. In this state, the liquid crystal is classified into positive (+) type liquid crystal having positive dielectric anisotropy and negative (−) type liquid crystal having negative dielectric anisotropy according to electrical characteristics of the liquid crystal. In the positive (+) type liquid crystal, a longitudinal axis of a positive (+) liquid crystal molecule is parallel to the electric field applied to the liquid crystal. In the negative (−) type liquid crystal, a longitudinal axis of a negative (−) liquid crystal molecule is perpendicular to the electric field applied to the liquid crystal.

FIG. 1 is an exploded perspective view illustrating parts of a general Twisted Nematic (TN) mode LCD device. As shown in FIG. 1, the general TN mode LCD device includes lower and upper substrates 1 and 2 bonded to each other at a predetermined interval, and a liquid crystal layer 3 formed by injecting a liquid crystal material between the lower and upper substrates 1 and 2.

The lower substrate 1 includes a plurality of gate lines 4, a plurality of data lines 5, a plurality of pixel electrodes 6, and a plurality of thin film transistors T. The plurality of gate lines 4 are formed on the lower substrate 1 in one direction at fixed intervals, and the plurality of data lines 5 are formed perpendicular to the plurality of gate lines 4 at fixed intervals, thereby defining a plurality of pixel regions P. Subsequently, the plurality of pixel electrodes 6 are respectively formed in the pixel regions P defined by the plurality of gate and data lines 4 and 5 crossing each other, and the plurality of thin film transistors T are respectively formed at crossing portions of the plurality of gate and data lines 4 and 5. Also, the upper substrate 2 includes a black matrix layer 7 that excludes light from regions except the pixel regions P, an R/G/B color filter layer 8 for displaying various colors, and a common electrode 9 for displaying a picture image. The thin film transistor T includes a gate electrode protruding from the gate line 4, a gate insulating layer (not shown) on an entire surface of the lower substrate 1, an active layer on the gate insulating layer above the gate electrode, a source electrode protruding from the data line 5, and a drain electrode opposite to the source electrode. Also, the pixel electrode 6 is formed of a transparent conductive metal material having the increased light transmittance, such as indium-tin-oxide (ITO).

In the aforementioned TN mode LCD device, liquid crystal molecules of the liquid crystal layer 3 positioned on the pixel electrode 6 are aligned according to a signal applied from the thin film transistor T, and light transmittance through the liquid crystal layer 3 is controlled by the alignment of the liquid crystal layer 3, thereby displaying the picture image. Also, the liquid crystal molecules are driven according to an electric field perpendicular to the lower and upper substrates, thereby obtaining increased light transmittance and high aperture ratio. The common electrode 9 of the upper substrate 2 serves as a ground, whereby it is possible to prevent liquid crystal cells from being damaged by static electricity. However, the TN mode LCD has disadvantageous characteristics such as a narrow viewing angle.

In order to solve this problem, an IPS mode LCD device has been proposed. FIG. 2 is a cross-sectional view illustrating a general IPS mode LCD device. As shown in FIG. 2, a pixel electrode 12 and a common electrode 13 are formed on a lower substrate 11. Then, an upper substrate 15 is bonded to the lower substrate 11 at a predetermined interval therebetween, and a liquid crystal layer 14 is formed between the lower and upper substrates 11 and 15. The liquid crystal layer 14 is driven according to an electric field parallel to the lower and upper substrates 11 and 15 between the pixel electrode 12 and the common electrode 13.

FIG. 3A and FIG. 3B illustrate the alignment direction of liquid crystal when a voltage is turned off/on in the IPS mode LCD device. FIG. 3A illustrates the IPS mode LCD device when the voltage is turned off. For example, when an electric field parallel to the lower and upper substrates is not applied to the common electrode 13 or the pixel electrode 12, there is no change in alignment of the liquid crystal layer 14. In more detail, the liquid crystal molecules are twisted at 45° with reference to the pixel electrode 12 and the common electrode 13. FIG. 3B illustrates the IPS mode LCD device when the voltage is turned on i.e., when an electric field parallel to the lower and upper substrates is applied to the common electrode 13 and the pixel electrode 12. Accordingly, the alignment direction of the liquid crystal layer 14 is changed. In more detail, the alignment of liquid crystal layer 14 is twisted more at 45° as compared to the alignment of liquid crystal layer when the voltage is turned off. In this state, the horizontal direction of the common and pixel electrodes 13 and 12 is identical to the twisted direction of liquid crystal molecules.

As mentioned above, the IPS mode LCD device has the common electrode 13 and the pixel electrode 12 on the same plane. Thus, it has advantageous characteristics such as a wide viewing angle. For example, along a front direction of the IPS mode LCD device, a viewer can have a viewing angle of 70° in all directions (i.e., lower, upper, left, and right directions). Furthermore, the IPS mode LCD device has simplified manufacturing process steps, and reduced color shift. However, the IPS mode LCD device has the problems of low light transmittance and low aperture ratio because the common electrode 13 and the pixel electrode 12 are formed on the same substrate. Also, in the case of the IPS mode LCD device, a rapid response time is required, and it is necessary to maintain a uniform cell gap due to a small misalignment margin.

FIG. 4A and FIG. 4B are perspective views illustrating the operation of the IPS mode LCD device when the voltage is turned on/off. As shown in FIG. 4A, when the electric field parallel to the lower and upper substrates is not applied to the pixel electrode 12 or the common electrode 13, the alignment direction 16 of the liquid crystal molecules is the same as an alignment direction of an initial alignment layer (not shown). As shown in FIG. 4B, when the electric field parallel to the lower and upper substrates is applied to the pixel electrode 12 and the common electrode 13, the alignment direction 16 of the liquid crystal molecules corresponds to a direction 17 of the applied electric field.

Hereinafter, a related art LCD device will be described with reference to the accompanying drawings. FIG. 5 is a plan view illustrating an IPS mode LCD device according to the related art, and FIG. 6 is a cross-sectional view taken along lines I-I' and II-II' of FIG. 5. FIG. 7 is a plane view illustrating another IPS mode LCD device according the related art, and FIG. 8 is a cross-sectional view taken along lines III-III' and IV-IV' of FIG. 7. FIG. 9 is a plane view illustrating another IPS mode LCD device according to the related art, and FIG. 10 is a cross-sectional view taken along lines V-V' and VI-VI' of FIG. 9.

As shown in FIG. 5 and FIG. 6, a gate line 61 including a gate electrode 61a is formed on a transparent lower substrate 60. Then, a common line 61b including a common electrode 61c and a first storage electrode 61d is formed in parallel to the gate line 61 within a pixel region. After that, a gate insulating layer 62 of $SiN_x$ or $SiO_x$ is formed on an entire surface of the lower substrate 60 including the gate line 61 and the common line 61b. Also, an island-shaped active layer 63 is formed on the gate insulating layer 62 above the gate electrode 61a. In order to define the pixel region, a data line 64 is formed on the gate insulating layer 62 perpendicular to the gate line 61. The data line 64 includes source/drain electrodes 64a/64b overlapped with both sides of the active layer 63. The plurality of common electrodes 61c are formed as one body with the common line 61b parallel to the data line 64 within the pixel region. Then, a pixel electrode 64d extending from the drain electrode 64b are formed between the common electrodes 61c, and a second storage electrode 64c extending from the pixel electrode 64c is formed on the common line 61b and the first storage electrode 61d. In the aforementioned structure, the drain electrode 64b and the pixel electrode 64d are formed on the same layer as the second storage electrode 64c in one body. After that, an upper substrate 50 is formed opposite to the lower substrate 60. The upper substrate 50 includes a black matrix layer 51 that excludes light from regions except the pixel regions of the lower substrate 60, and an R/G/B color filter layer 52 corresponding to the pixel regions of the lower substrate 60. The black matrix layer 51 is formed to cover the interval between the data line 64 and the adjacent common electrode 61c. Furthermore, the black matrix layer 51 is formed as a large dimension because of the bonding margin of the lower and upper substrates corresponding the data line 64, the gate line 61 and the thin film transistor TFT.

However, the IPS mode LCD device according to the related art has the following disadvantages. The opaque common line (electrode) and the pixel electrode are formed at predetermined portions of the pixel region, thereby lowering the aperture ratio. Also, the black matrix layer is formed to have a large dimension because of the bonding margin of the lower and upper substrates to prevent light leakage between the gate line and the common line, whereby the aperture ratio lowers.

In order to improve the aperture ratio, another IPS mode LCD device according to the related art will be described. As shown in FIG. 7 and FIG. 8, a gate line 81 including a gate electrode 81a is formed on a transparent lower substrate 80. Then, a common line 81b including a common electrode 81c and a first storage electrode 81d is formed in parallel to the gate line 81 within a pixel region. After that, a gate insulating layer 82 of $SiN_x$ or $SiO_x$ is formed on an entire surface of the lower substrate 80 including the gate line 81 and the common line 81b, and an island-shaped active layer 83 is formed on the gate insulating layer 82 above the gate electrode 81a. In order to define the pixel region, a data line 84 is formed on the gate insulating layer 82 perpendicular to the gate line 81. The data line 84 includes source/drain electrodes 84a/84b overlapping both sides of the active layer 83. At this time, a second storage electrode 84c is formed on the common line 81b and the first storage electrode 81d. The plurality of common electrodes 81c are formed as one body with the common line 61b parallel to the data line 64 within the pixel region. First and second contact holes 87a and 87b are formed in the drain electrode 84b and the second storage electrode 84c. An insulating interlayer 85 is formed on the entire surface of the substrate including the data line 84 in state of forming first and second contact holes 87a and 87b in the drain electrode 84b and the second storage electrode 84c. Also, a pixel electrode 86 is formed between the common electrodes 81c to be connected with the drain electrode 84b and the second storage electrode 84c through the first and second contact holes 87a and 87b. In the aforementioned LCD device, the pixel electrode 86 is formed of a transparent conductive layer. Also, the drain electrode 84b is formed on the same layer as the second storage electrode 84c, and on the different layer from the pixel electrode 86. Next, an upper substrate 70 is formed opposite to the lower substrate 80. The upper substrate 70 includes a black matrix layer 71 that excludes light from regions except the pixel regions of the lower substrate 80, and an R/G/B color filter layer 72 corresponding to the pixel regions of the lower substrate 80. The black matrix layer 71 is formed to cover the interval between the data line 84 and the adjacent common electrode 81c. Furthermore, the black matrix layer 71 is formed as a large dimension because of the bonding margin of the lower and upper substrates corresponding to the data line 84, the gate line 81 and the thin film transistor T.

The IPS mode LCD device explained in FIG. 7 and FIG. 8 has the following disadvantages. In the IPS mode LCD device of FIG. 7 and FIG. 8, the pixel electrode is formed of the transparent material, whereby it is possible to improve the aperture ratio as compared with that of the IPS mode LCD device explained in FIG. 5. However, because the common line (electrode) is formed at the predetermined portion of the pixel region, the aperture ratio lowers. Furthermore, the black matrix layer is formed as a large dimension because of the bonding margin of the lower and upper substrates to prevent light leakage between the gate line and the common line, whereby the aperture ratio is lowered.

In order to improve the aperture ratio, another IPS mode LCD device according to the related art will be described as follows. As shown in FIG. 9 and FIG. 10, a gate line 101 including a gate electrode 101a is formed on a transparent lower substrate 100, and a first common line 10b is formed in parallel to the gate line 101 within a pixel region. Then, a gate insulating layer 102 of $SiN_x$ or $SiO_x$ is formed on an entire surface of the lower substrate 100 including the gate line 101 and the first common line 101b, and an island-shaped active layer 103 is formed on the gate insulating layer 102 above the gate electrode 101a. In order to define the pixel region, a data line 104 is formed on the gate insulating layer 102 perpendicular to the gate line 101. The data line 104 includes source/drain electrodes 104a/104b overlapping both sides of the active layer 103. A storage electrode 104c is formed as one body with the drain electrode 104b and overlaps the first common line 101b. An insulating interlayer 105 is formed on the entire surface of the lower substrate 100 including the data line 104. The insulating interlayer 105 has a contact hole 106 on the drain electrode 104b and the storage electrode 104c. Also, a pixel electrode 107c is connected to the drain electrode 104b and the storage electrode 104c through the contact hole 106. The pixel electrode 107c is parallel to the data line 104 within the pixel region. Simultaneously, a second common line 107a is formed on the gate line 101, and a common electrode 107b is formed between the pixel electrode 107c and the data line 104 adjacent to the pixel region. The common electrode 107b is formed as one body with the second common line 107a. The pixel electrode 107c, the second common line 107a and the common electrode 107b are formed of a transparent conductive layer on the same layer. The first common line 10b and the second common line 107a are connected to each other in a non-display region, and the same common voltage is additionally applied to the first common line 10b and the second common line 107a. Then, an upper substrate 90 is formed opposite to the lower substrate 100, the upper substrate 90 including a black matrix layer 91 that excludes light from regions except the pixel regions P of the lower substrate 100, and an R/G/B color filter layer 92 corresponding to the pixel regions P. Although not shown, the lower and upper substrates are bonded to each other with a sealant in state of forming a liquid crystal injection inlet between the lower substrates.

In the IPS mode LCD device explained with reference to FIG. 9 and FIG. 10, the common electrode and the pixel electrode are formed of the transparent material, whereby it is possible to obtain the high aperture ratio. However, because the color filter layer is formed on the upper substrate, it may generate misalignment problems between the pixel region and the color filter layer when bonding the lower and upper substrates to each other. As glass substrates become large, the position difference is increased between the pixel region of the lower substrate and the color filter layer of the upper substrate. In order to overcome these problems, it is necessary to obtain a design that resolves the misalignment problem. In case of the design for solving the problem of the misalignment, the aperture ratio lowers after bonding the lower and upper substrates to each other.

Accordingly, a COT-structure (Color filter On TFT array) LCD device forming a color filter layer on a lower substrate is recently developed in order to overcome the problem of the position difference between the pixel region of the lower substrate and the color filter layer of the upper substrate. The COT-structure LCD device according to the related art will be briefly described. FIG. 11 is a cross-sectional view taken along line VI-VI' of FIG. 9 and illustrates a related art IPS mode LCD device having a COT structure therein. That is, a gate line ('101' of FIG. 9) including a gate electrode ('101a' of FIG. 9) is formed on a lower substrate 100. Then, a gate insulating layer 102 is formed on an entire surface of the lower substrate 10 including the gate line, and an island-shaped active layer ('103' of FIG. 9) is formed on the gate insulating layer 102 above the gate electrode. In order to define a pixel region, a data line 104 is formed on the gate insulating layer 102 perpendicular to the gate line, the data line 104 including source/drain electrodes ('104a' and '104b' of FIG. 9) overlapping both sides of the active layer. Then, an insulating interlayer 105 is formed on the entire surface of the substrate including the data line 104, and R/G/B color filter layers are formed on the insulating interlayer 105 of the respective pixel regions. If the R/G/B color filter layers are overlapped above the data line 104, it decreases the planarization effect of an organic insulating layer formed on the color filter layer. Accordingly, it is necessary to obtain a sufficient margin 'c' in due consideration of accuracy when forming the color filter layer. For example, when forming the color filter layer, position accuracy is about ±3 μm, whereby it requires the minimum margin 'c' of 6 μm on the designing process, and it generates a maximum interval of 12 μm on the practical manufacturing process. That is, the color filter layer overlaps both sides of the data line 104, and the color filter layer is not formed above the center of the data line 104. After that, the organic insulating layer 109 is formed on the entire surface of the substrate to flatten the surface of the substrate, and a contact hole ('106' of FIG. 9) is formed in the drain electrode ('104b' of FIG. 9). Also, a pixel electrode 107c is formed in parallel to the data line 104 within the pixel region and connected to the drain electrode through the contact hole. Simultaneously, a second common line 107b is formed between the pixel electrode 107c and the data line 104 adjacent to the pixel region. When the second common line 107b is formed above the data line 104, the second common line 107b is wider than both sides of the data line 104 in the extent of 'a' and 'b', wherein 'a' is formed in the same width as 'b'. The second common line 107b is formed at a width of approx. 4 µm.

However, the IPS mode LCD device having the COT structure has the following disadvantages. As shown in FIG. 11, the color filter layer is not formed above the predetermined portion of the data line to prevent the decrease of the planarization effect, thereby decreasing a contrast ratio by the reflection of the external light in the predetermined portion of the data line having no color filter layer. In order to solve this problem, a resin BM may be formed above the predetermined portion of the data line having no color filter layer. However, the resin BM is expensive, has low electrical characteristics due to its low resistivity, and generates the problem of impurity contamination on the particle source.

SUMMARY OF THE INVENTION

Accordingly, the present invention is directed to a LCD device and a method for manufacturing the same that substantially obviates one or more problems due to limitations and disadvantages of the related art.

An advantage of the present invention is to provide an IPS mode LCD device having a COT structure therein, and a method for manufacturing the same, to improve picture quality by decreasing the reflection of external light above the data line, to obtain the economic efficiency, to simplify the manufacturing process by forming a light-shielding layer of a metal material, and to solve the problem of decreasing aperture ratio after bonding lower and upper substrates to each other.

Additional advantages and features of the invention will be set forth in the description which follows, and in part will become apparent from the description, or may be learned by practice of the invention. These and other advantages of the invention may be realized and attained by the structure particularly pointed out in the written description and claims hereof as well as the appended drawings.

To achieve these and other advantages and in accordance with the purpose of the invention, as embodied and broadly described herein, a liquid crystal display (LCD) device includes first and second substrates facing each other; gate and data lines crossing each other on the first substrate to define a pixel region; a first common line parallel to the gate line; a thin film transistor at a crossing portion of the gate and data lines; an insulating interlayer on an entire surface of the first substrate including the data line; color filter layers in the pixel region to completely cover the data line; a planarization layer on the entire surface of the first substrate including the color filter layers; a second common line along the gate line and the thin film transistor; common electrodes completely overlapping the data line, and arranged at one direction in the pixel region; and a pixel electrode in contact with a drain electrode of the thin film transistor and formed between the common electrodes at fixed intervals.

In another aspect, a method for manufacturing a liquid crystal display (LCD) device includes forming a gate line including a gate electrode on a predetermined portion of a substrate; forming a first common line parallel to the gate line; forming a gate insulating layer on the substrate including the gate line; forming an active layer above the gate electrode; forming a data line perpendicular to the gate line to define a pixel region; forming source and drain electrodes that overlap both sides of the active layer; forming an insulating interlayer on an entire surface of the substrate including the data line; forming color filter layers in the pixel region to completely cover the data line; forming a planarization layer on the entire surface of the substrate including the color filter layers; forming a second common line above the gate line and a thin film transistor; forming common electrodes completely covering the data line in one direction within the pixel region; and forming a pixel electrode between the common electrodes at fixed intervals in the pixel region.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principle of the invention. In the drawings.

DETAILED DESCRIPTION OF THE INVENTION

Reference will now be made in detail to embodiments of the present invention, examples of which are illustrated in the accompanying drawings. Wherever possible, the same reference numbers will be used throughout the drawings to refer to the same or like parts.

Hereinafter, an LCD device according to an embodiment of the present invention will be described with reference to the accompanying drawings. The LCD device according to the embodiment is formed in an In-Plane switching (IPS) mode of a COT (Color filter On TFT array) structure for forming a color filter layer on a lower substrate. In the aforementioned COT structure, a light-shielding layer (a black matrix layer) is formed above a channel region of a thin film transistor TFT on the lower substrate. The light-shielding layer is formed of metal instead of resin, as in the related art. Also, the color filter layer and a common electrode completely overlap each other above a data line.

Figure 1:
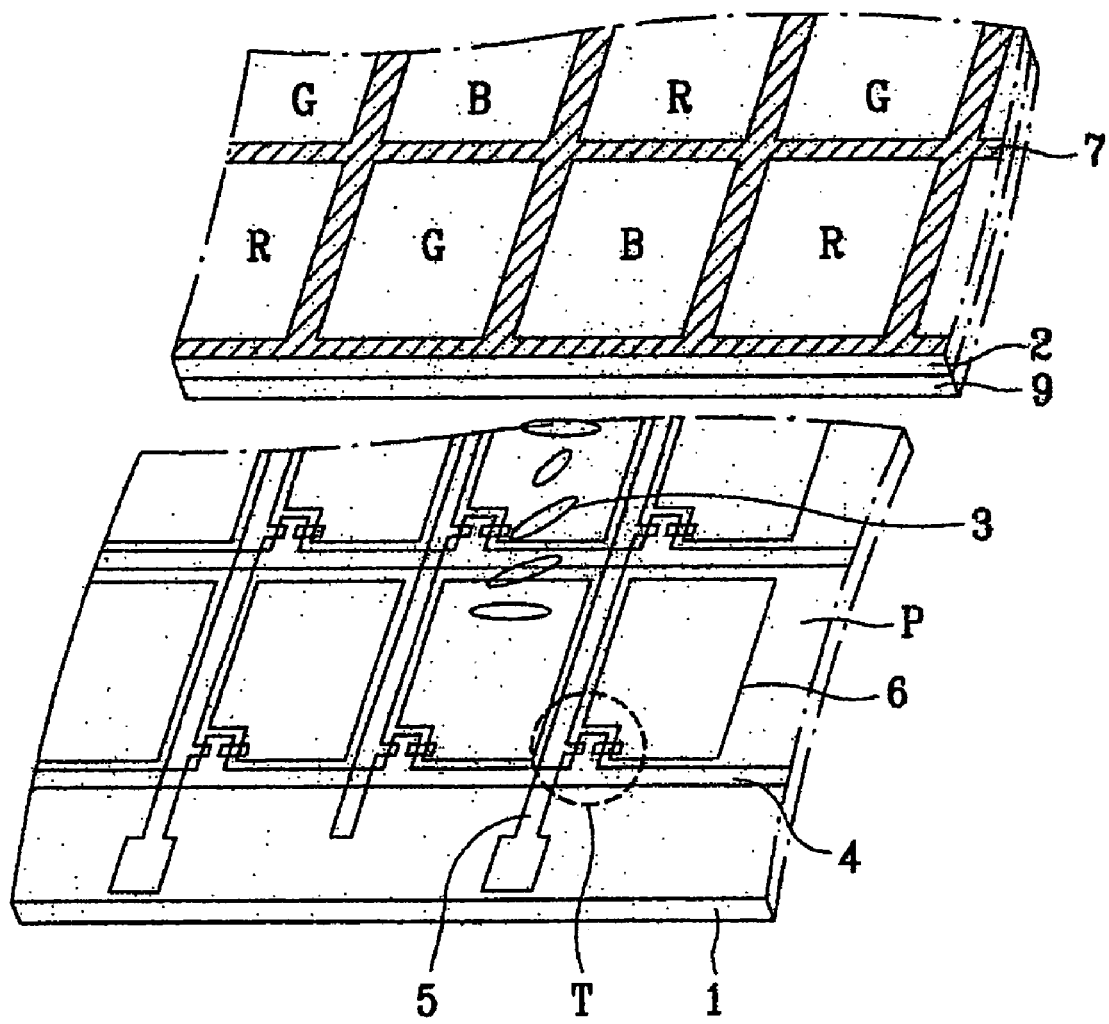
FIG. 1 is an exploded perspective view illustrating some parts of a general TN mode LCD device.
Figure 2:
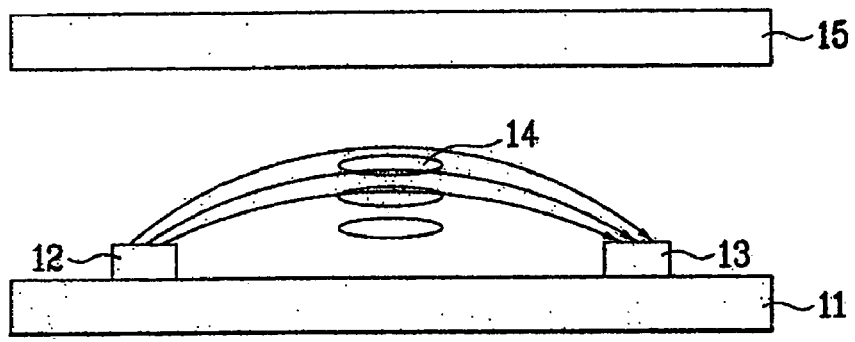
FIG. 2 is a cross-sectional view illustrating a general IPS mode LCD device.
Figure 3A:
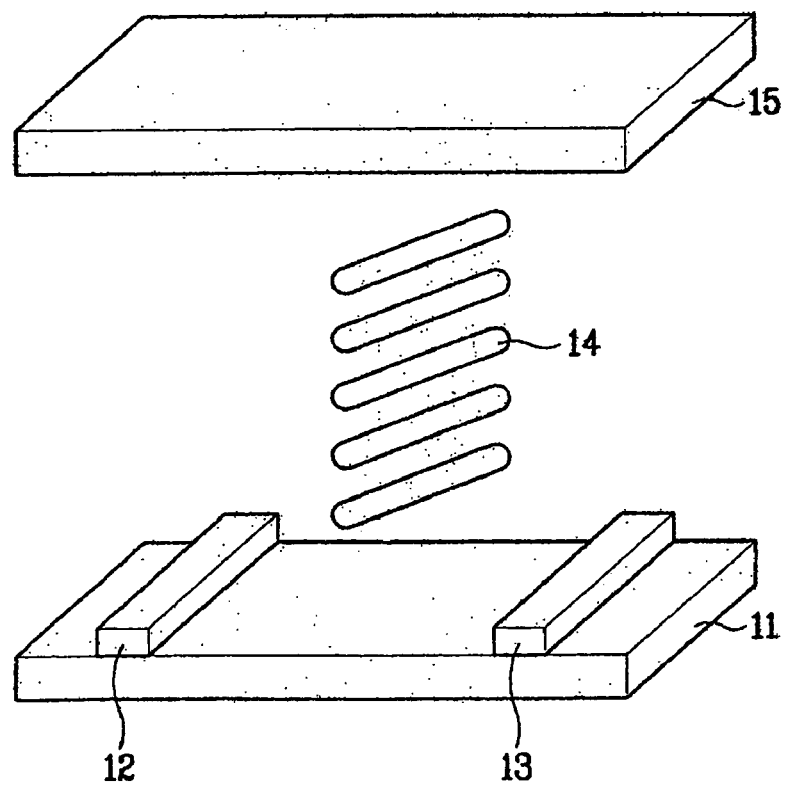
FIG. 3A and FIG. 3B illustrate the alignment direction of liquid crystal when a voltage is turned off/on in the IPS mode LCD device.
Figure 3B:
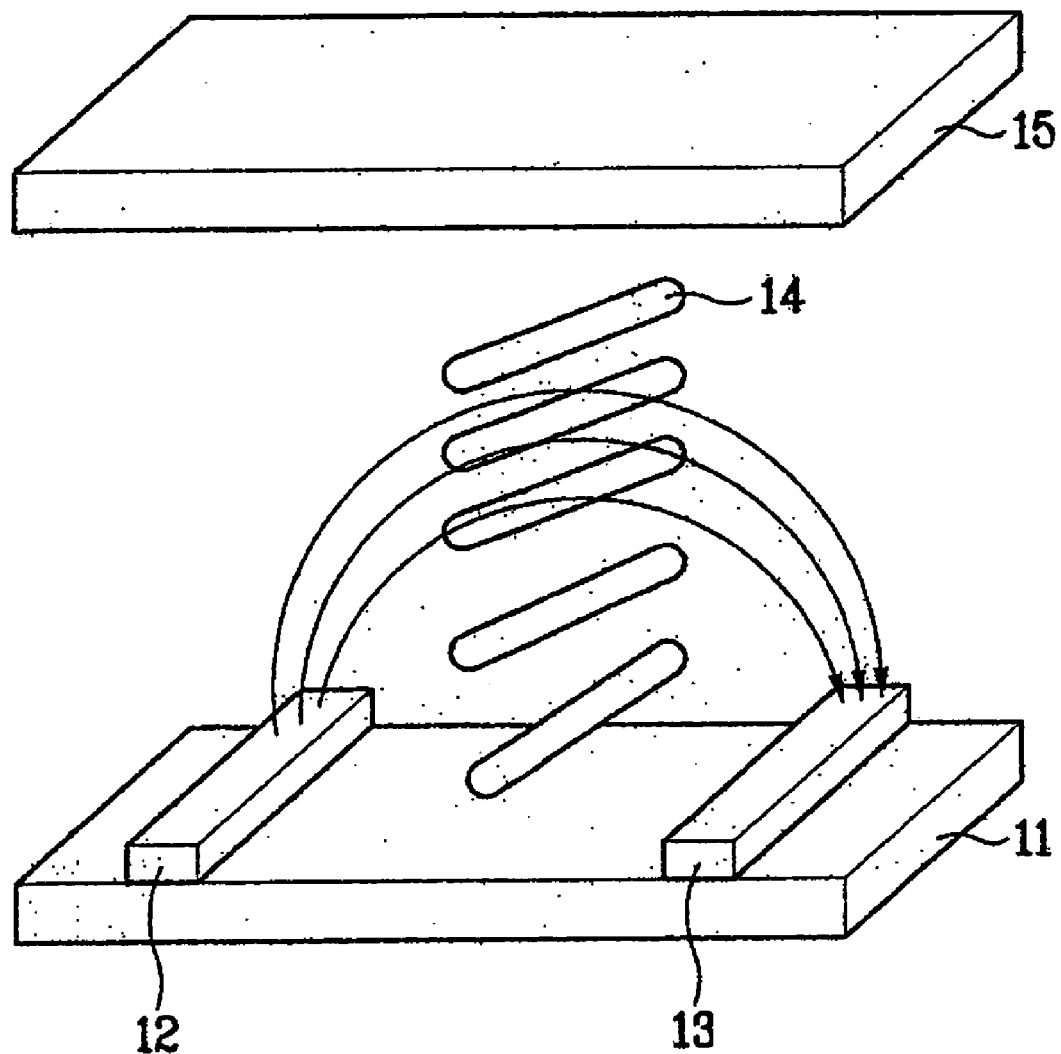
Figure 4A:
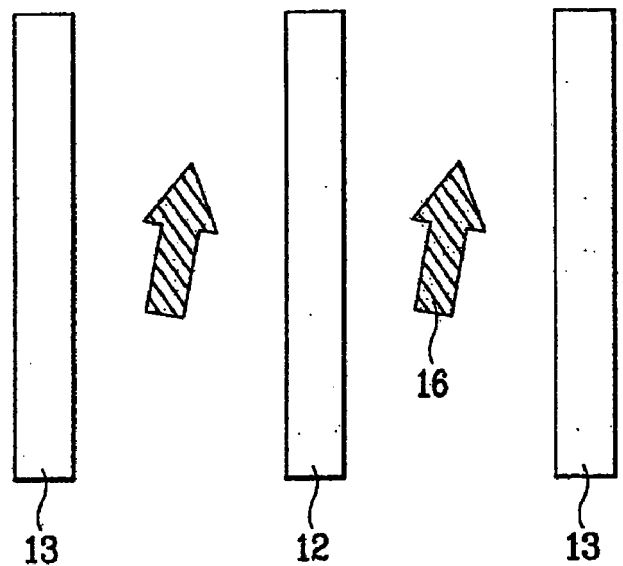
FIG. 4A and FIG. 4B are perspective views illustrating the operation of the IPS mode LCD device when the voltage is turned on/off.
Figure 4B:
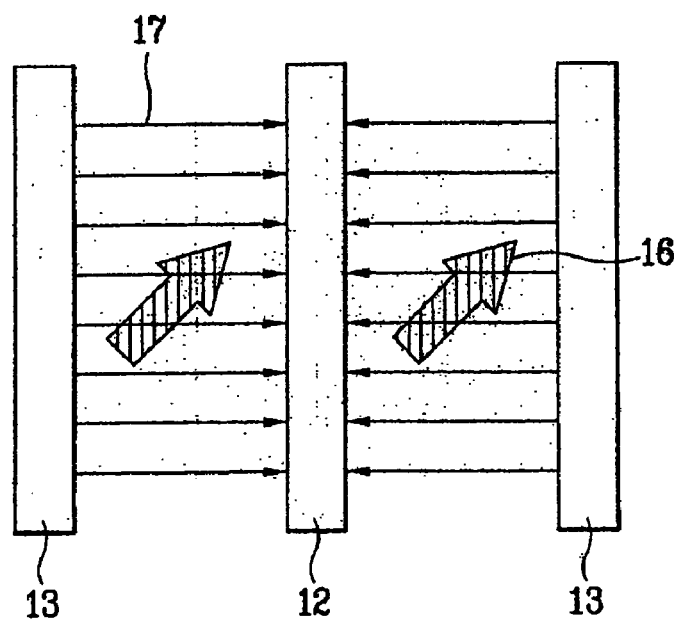
Figure 5:
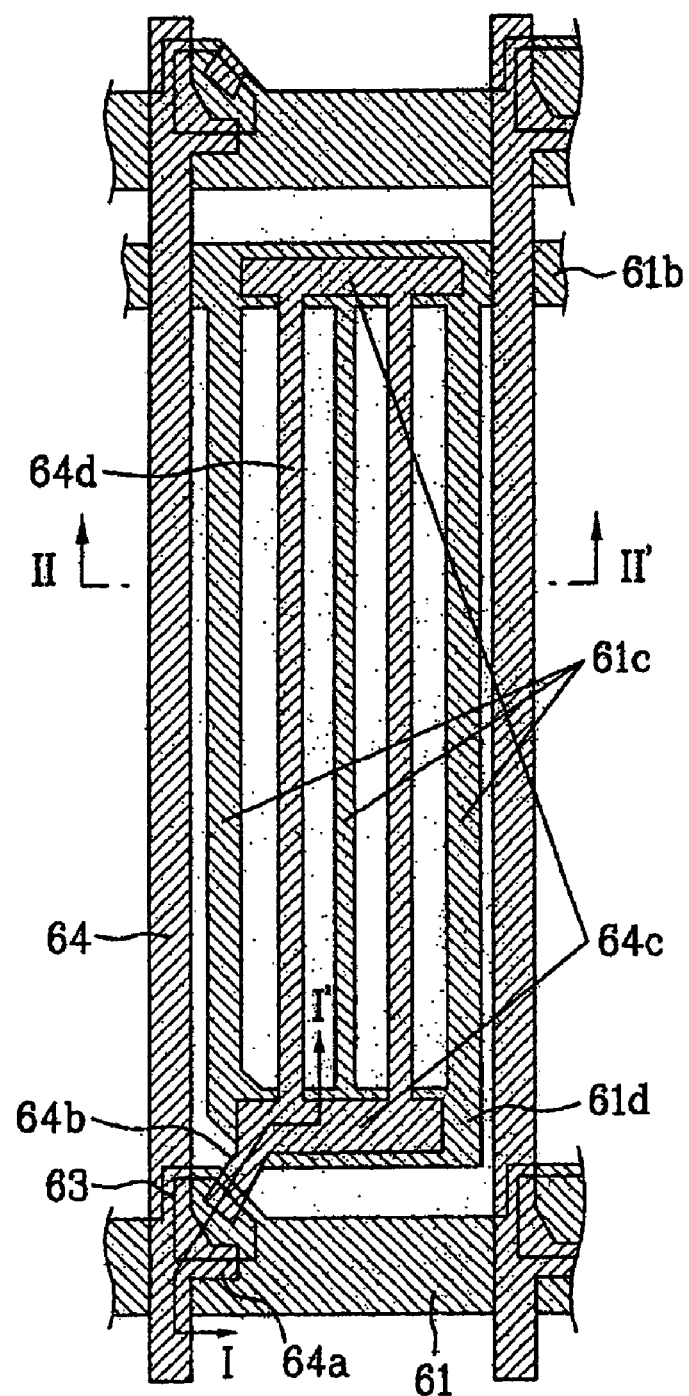
FIG. 5 is a plan view illustrating an LCD device according to the related art.
Figure 6:
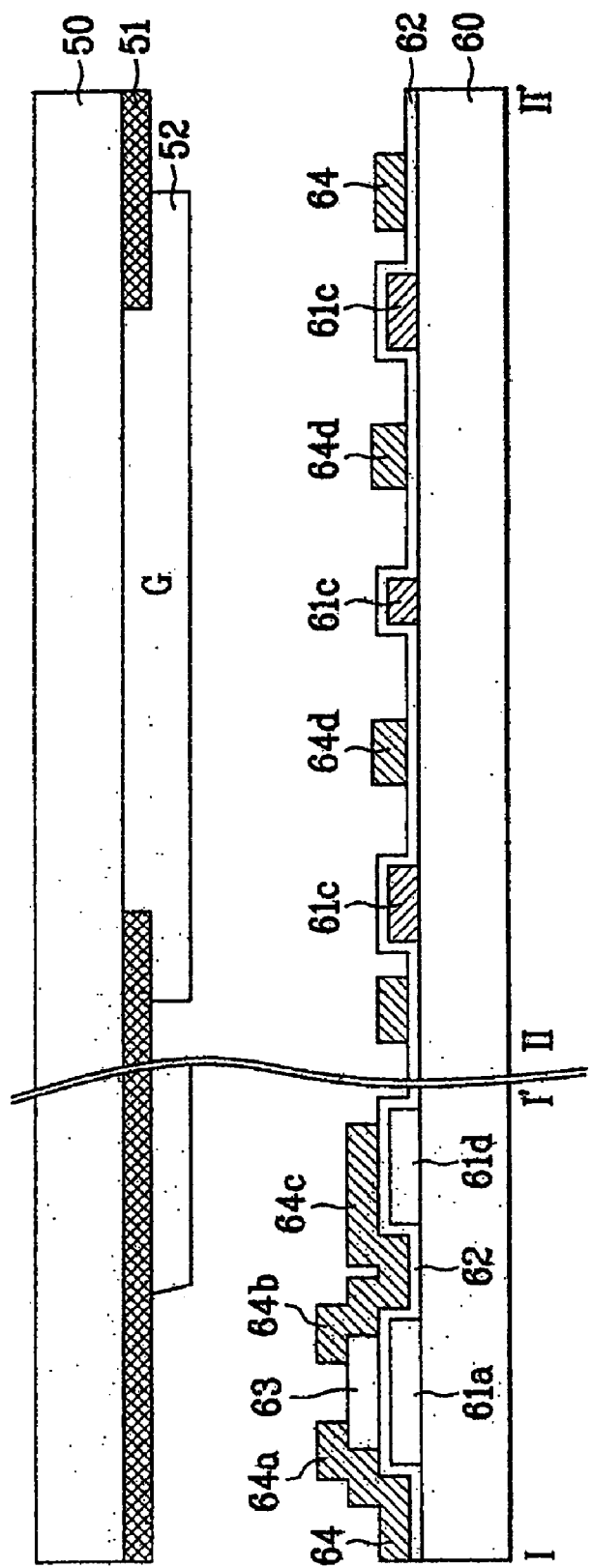
FIG. 6 is a cross-sectional view taken along lines I-I' and II-I' of FIG. 5.
Figure 7:
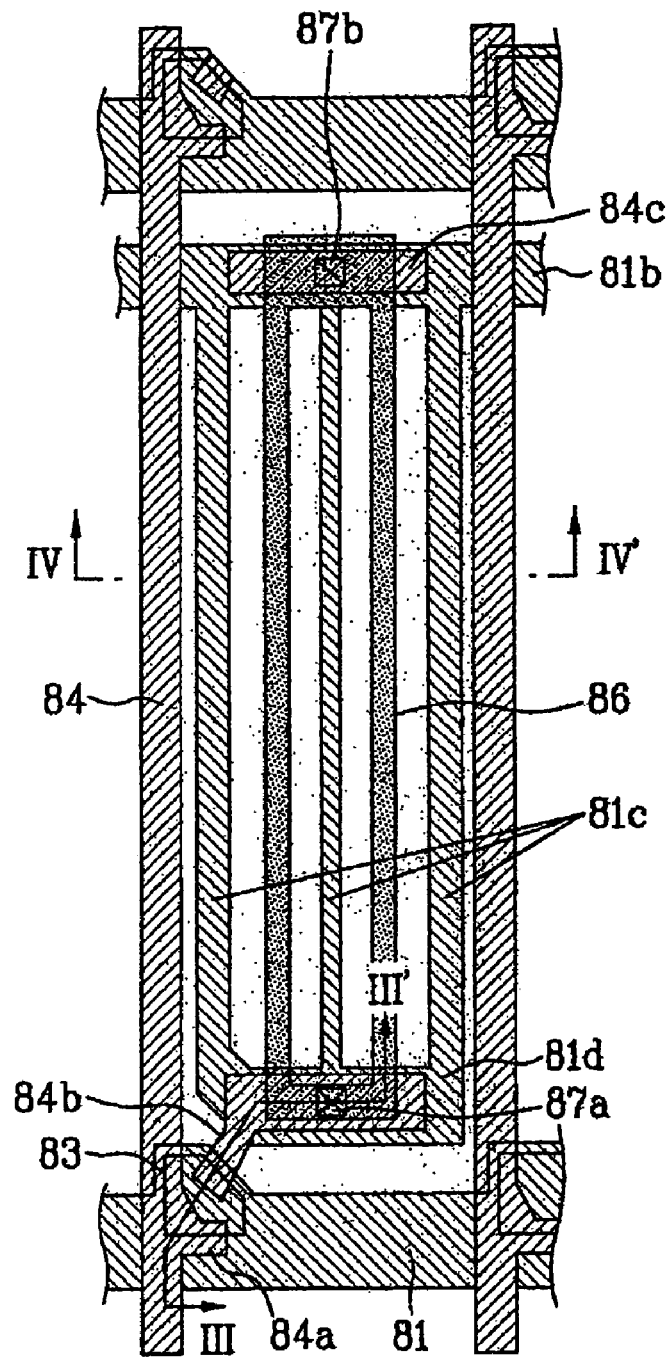
FIG. 7 is a plan view illustrating another LCD device according to the related art.
Figure 8:
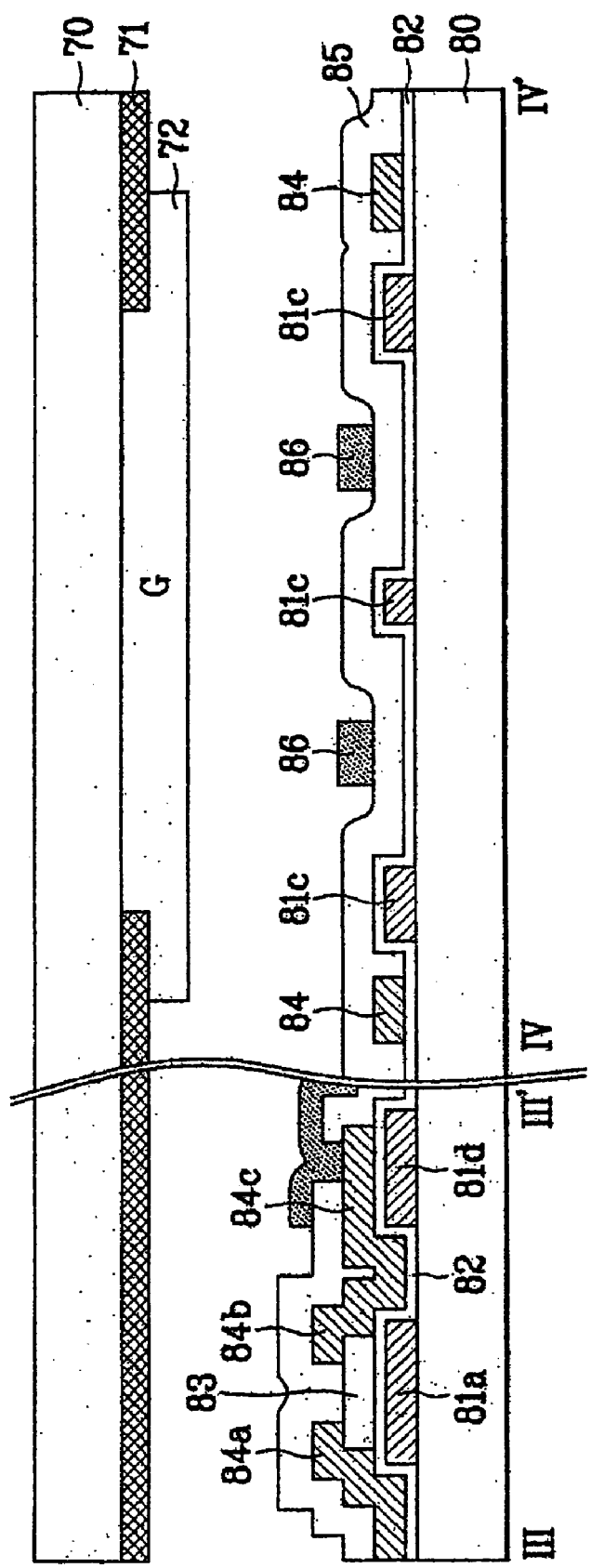
FIG. 8 is a cross-sectional view taken along lines III-III' and IV-IV' of FIG. 7.
Figure 9:
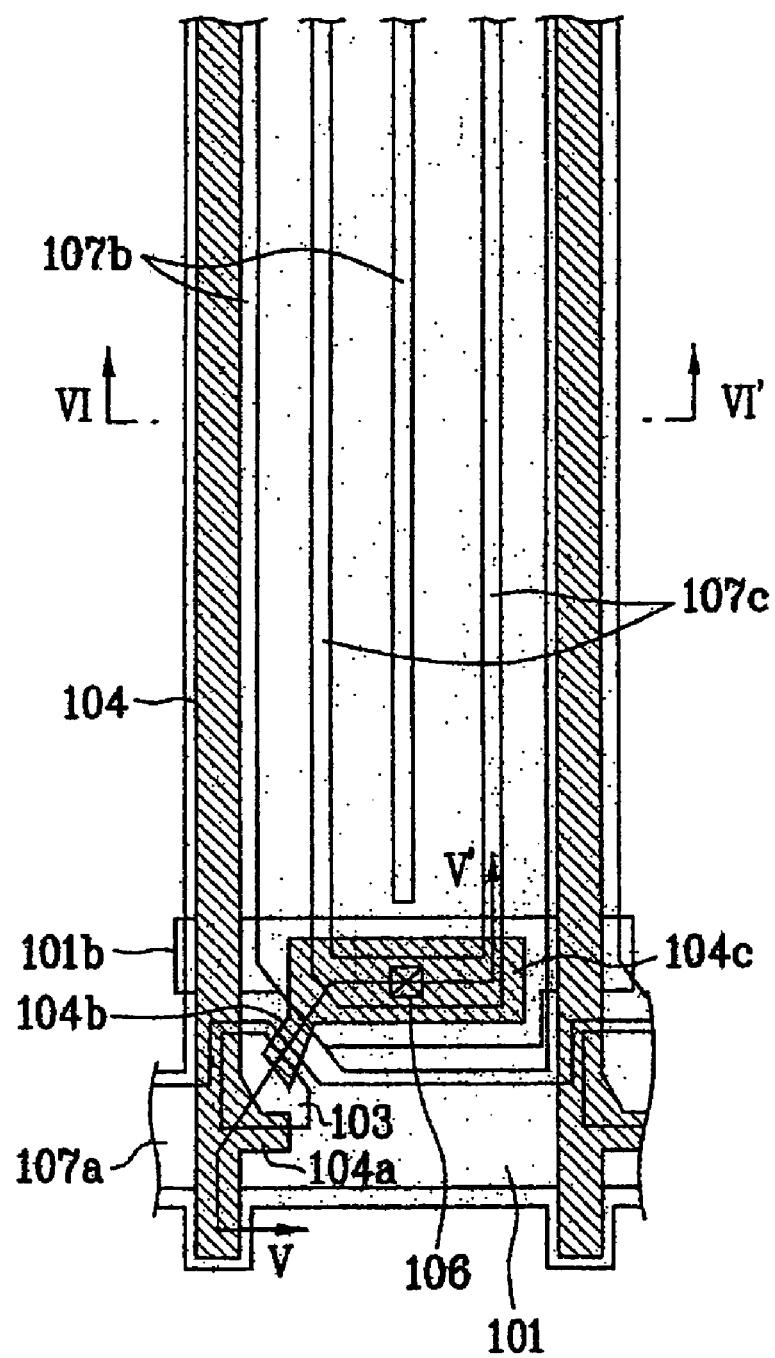
FIG. 9 is a plan view illustrating another LCD device according to the related art.
Figure 10:
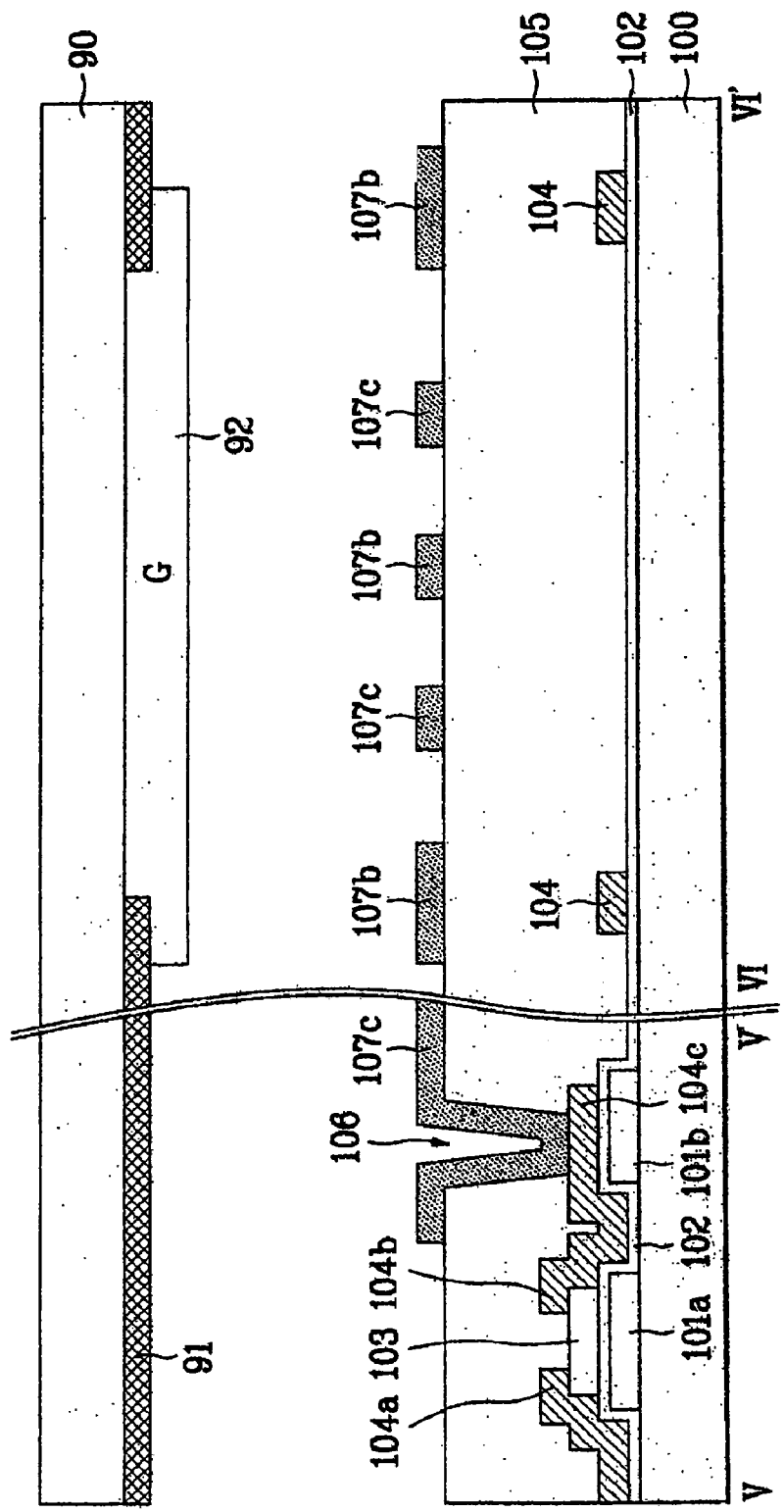
FIG. 10 is a cross-sectional view taken along lines V-V' and VI-VI' of FIG. 9.
Figure 11:
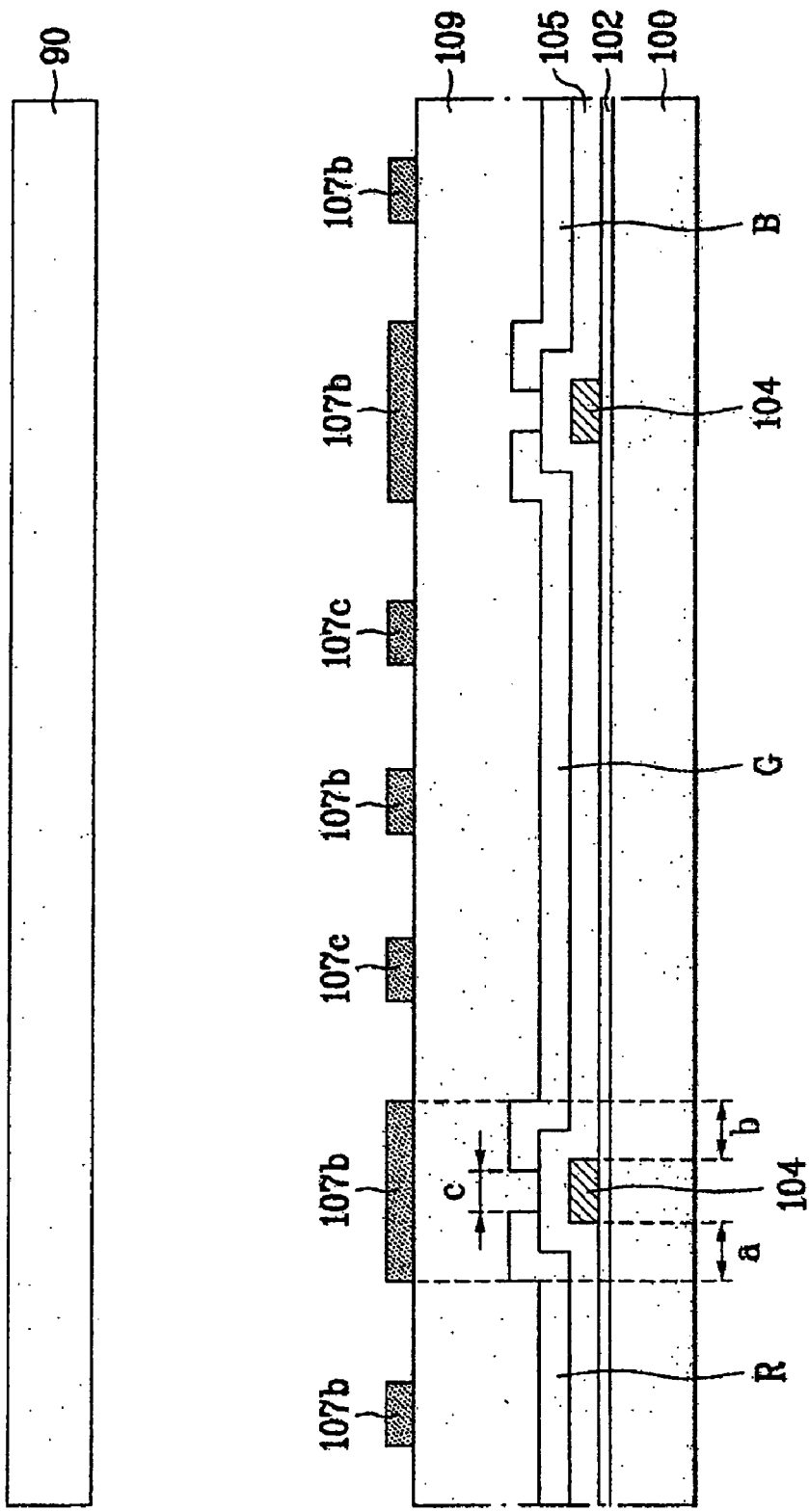
FIG. 11 is a cross-sectional view illustrating an IPS mode LCD device having a COT structure therein according to the related art.
Figure 12:
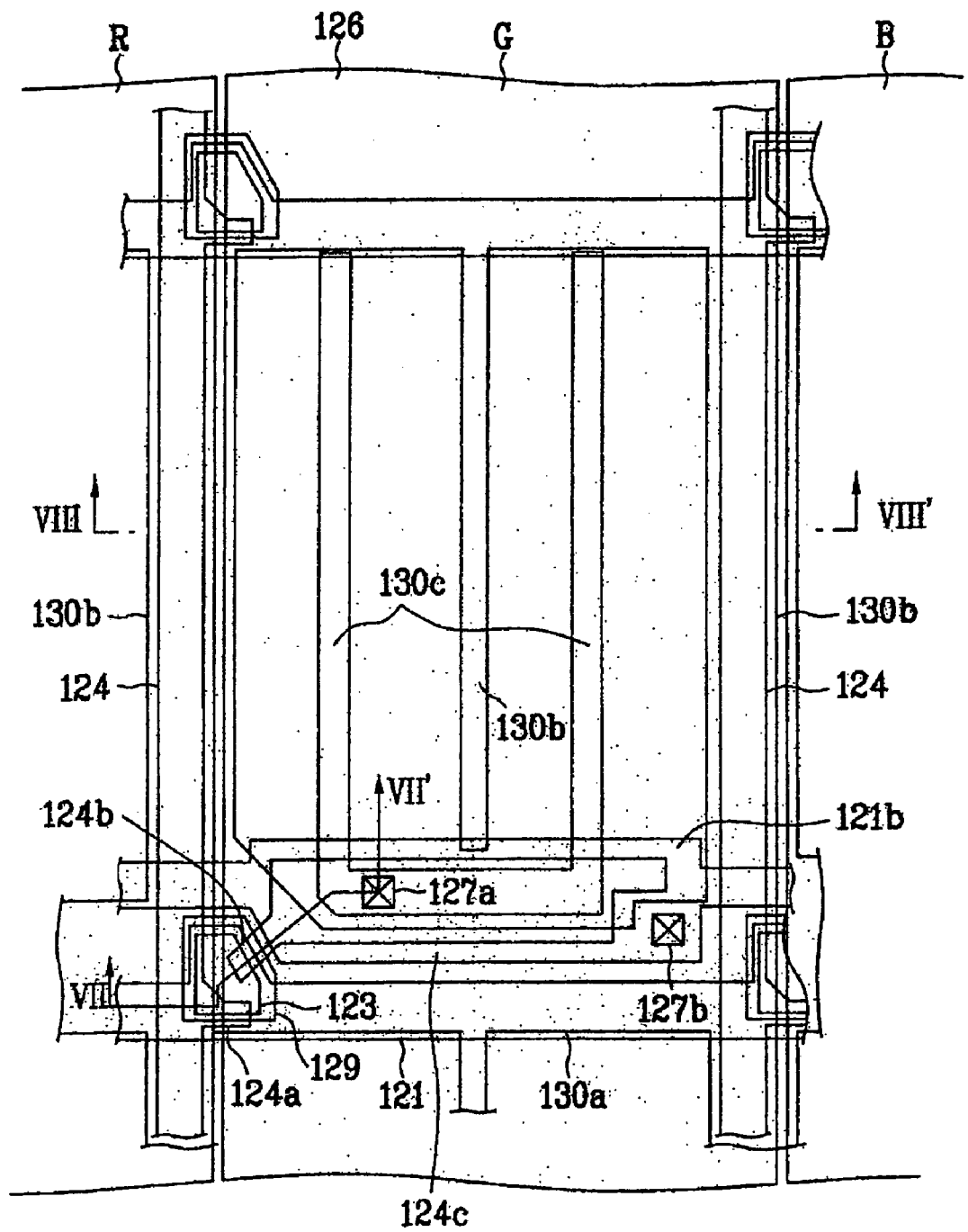
FIG. 12 is a plan view illustrating an LCD device according to the preferred embodiment of the present invention.
Figure 13A:
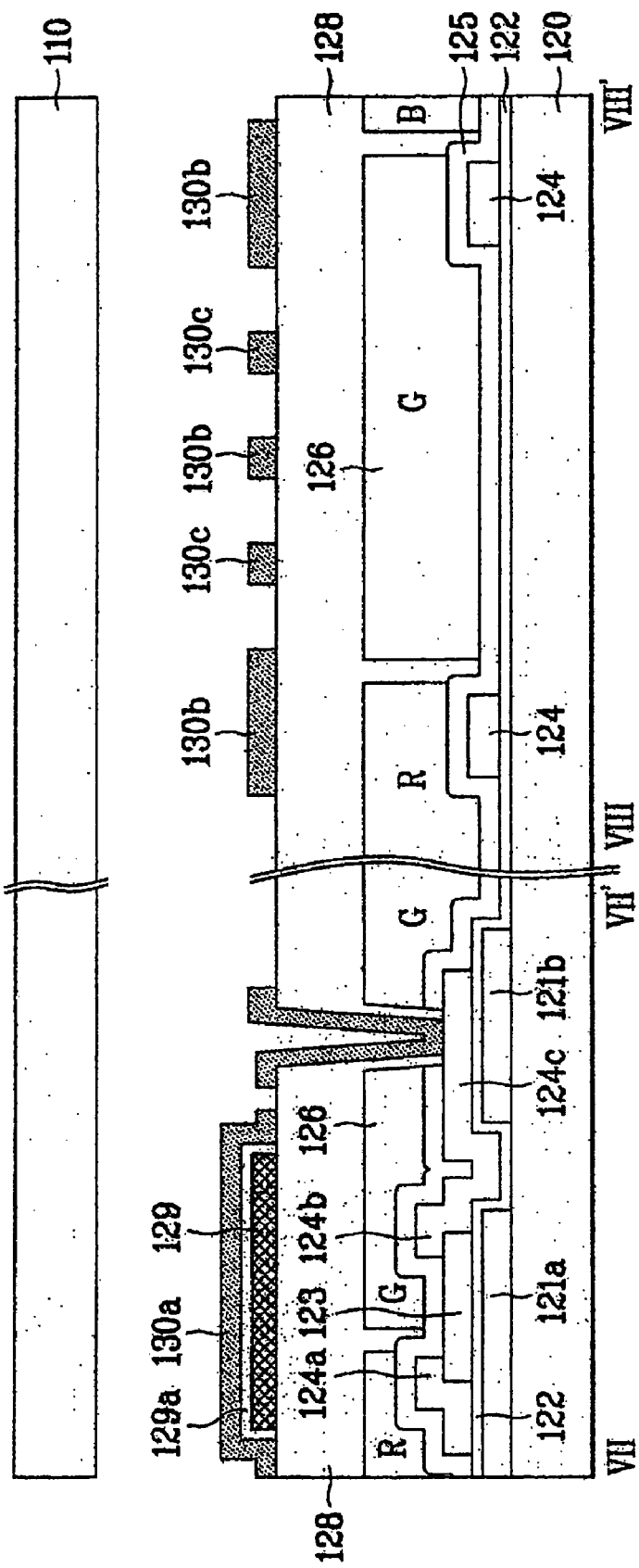
FIG. 13A is a cross-sectional view taken along lines VII-VII' and VIII-VIII' of FIG. 12.
Figure 13B:
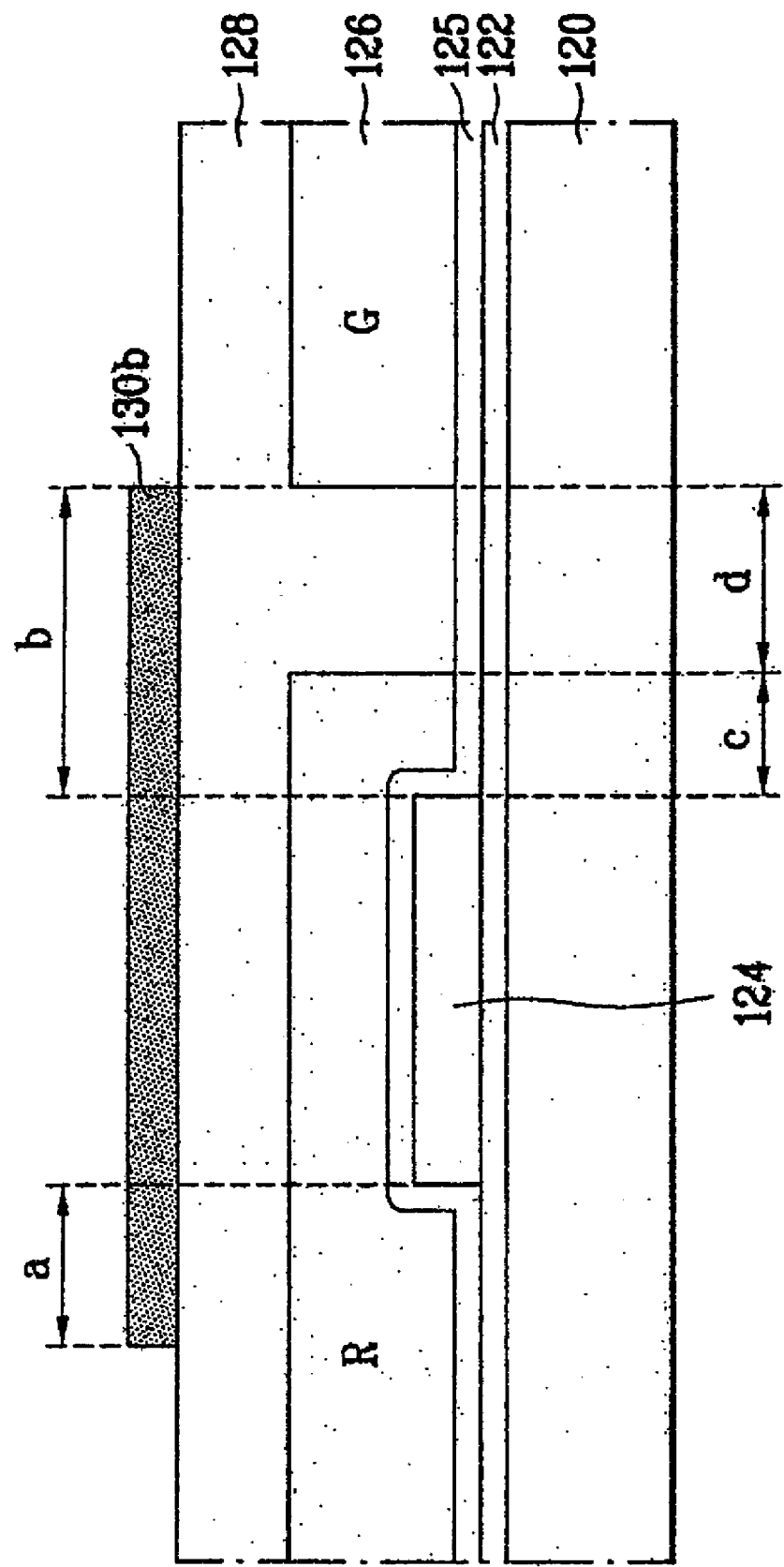
FIG. 13B is an expanded cross-sectional view illustrating a data line of FIG. 13A.

An LCD device according to an embodiment of the present invention will be described as follows. FIG. 12 is a plan view illustrating an LCD device according to the embodiment of the present invention. FIG. 13A is a cross-sectional view taken along lines VII-VII' and VIII-VIII' of FIG. 12. FIG. 13B is an expanded cross-sectional view of a data line shown in FIG. 13A.

The LCD device according to the embodiment of the present invention is formed as an In-Plane switching (IPS) mode, wherein a common electrode is formed on a lower substrate. As shown in FIG. 12 and FIG. 13A, a gate line 121 including a gate electrode 121a is formed on a transparent lower substrate 120 in one direction, and a first common line 121b is formed on the same layer as the gate line 121 in parallel. Then, a gate insulating layer 122 of $SiN_x$ or $SiO_x$ is formed on an entire surface of the lower substrate 120 including the gate line 121 and the first common line 121b. Also, an island-shaped active layer 123 is formed on the gate insulating layer 122 above the gate electrode 121a. In order to define a pixel region, a data line 124 is formed perpendicular to the gate line 121. Simultaneously, a source electrode 124a protruding from the data line 124 overlaps one side of the active layer 123, and a drain electrode 124a overlaps the other side of the active layer 123 at a predetermined interval from the source electrode 124a. After that, an insulating interlayer 125 is formed on the entire surface of the lower substrate 120 including the data line 124, the source electrode 124a and the drain electrode 124b. Also, R/G/B color filter layers 126 are formed in the respective pixel regions of the lower substrate, and completely overlap the data line 124.

Then, an insulating (planarization) layer 128 is formed on the entire surface of the lower substrate 120 including the color filter layer 126 to flatten the surface of the substrate. The insulating layer 128 has a first contact hole 127a on the drain electrode 124b, and a second contact hole 127b on the first common line 121b. Next, a light-shielding layer 129 is formed on the insulating layer 128 above a channel region of a thin film transistor TFT having the gate electrode 121a, the source electrode 124a and the drain electrode 124b. Also, a second common line 130a is formed on a thin film transistor region including the light-shielding layer 129 and the insulating layer 128 above the gate line 121, and is connected to the first common line 121b through the second contact hole 127b. A common electrode 130b is formed to completely cover the data line 124 parallel at a predetermined portion of the pixel region. The second common line 130a and the common electrode 130b may be in contact with the first common line 121b outside of an active region of an LCD panel, or an external power may be provided to the second common line 130a and the common electrode 130b. In this state, the second common line 130a is formed as one body with the common electrode 130b.

In the aforementioned LCD device, the second common line 130a, the common electrode 130b and the pixel electrode 130c are formed on the same layer, and formed of indium-tin-oxide (ITO), tin-oxide (TO), indium-zinc-oxide (IZO), or indium-tin-zinc-oxide (ITZO) or other transparent conductive material. Also, the pixel electrode 130c is formed between and parallel to the common electrodes 130b within the pixel region, and is connected to the drain electrode 124b through the first contact hole 127a. A storage electrode 124c extending from the drain electrode 124b is formed on the gate insulating layer 122 above the first common line 121b. Herein, the LCD device according to the first embodiment of the present invention has a Storage On Common structure. Although not shown, an alignment layer (not shown) of polyimide or other such material is formed on the entire surface of the lower substrate 120.

The data line 124, the color filter layer 126 and the common electrode 130b of the IPS mode LCD device having the COT structure according to the present invention will be described in detail. As shown in FIG. 13B, the color filter layer 126 is formed to completely cover the data line 124 to decrease the reflection of the external light. Also, the respective R/G/B color filter layers are positioned at sufficient intervals to prevent a decreased planarization effect. The common electrode 130b is formed above the data line 124 to provide sufficient margin for covering the data line 124 and the interval between the color filter layers, thereby preventing a voltage of the data line 124 from effecting a pixel voltage. That is, the common electrode 130b completely overlaps the data line 124, wherein the common electrode 130b is driven together with the adjacent pixel electrode 130 according to an electric field parallel to the substrates. To prevent the effect of the voltage of the data line 124 on the voltage of the pixel electrode 130c, the common electrode 130b above the data line 124 is formed to have a predetermined margin on the left side, and to have a predetermined margin for accuracy of the color filter layers corresponding to the interval between the color filter layers 126 at the right side. For example, as shown in FIG. 13B, the common electrode 130b has the margin (a) of approx. 4 μm at one side, the margin (c) of approx. 3 μm between one side of the color filter layer 126 that overlaps the data line 124 and one side of the data line 124, the margin (d) of approx. 6 μm corresponding to the interval between the color filter layers, and the margin (b) of approx. 9 μm between the other side of the common line 130b and the data line 124. The margin (a) and the margin (b) of the common electrode 130b are asymmetric. The margin (c) between one side of the color filter layer 126 and one side of the data line 124 may be controlled based upon an allowable reflection extent of the external light. The margin (d) corresponding to the interval between the color filter layers may be controlled based upon the planarization level.

When forming the respective R/G/B color filter layers 126 to cover the data lines 124 completely, if the respective R/G/B color filter layers 126 have a light transmittance of approx. 30%, the external light is incident on the R/G/B color filter layers 126, and then reflected to the external. Thus, the external light passes through the color filter layers 126 two times, so that the reflexibility of the external light lowers at approx. 9% by 30%×30%. In order to prevent a signal delay of the gate line 121 and the data line 124 by the second common line 130a and the common electrode 130b, the insulating layer 128 is formed of at least one of photoacryl, polyimide, and BCB (BenzoCycloButene) at a thickness of approx. 3 μm. Also, the light-shielding layer 129 is formed of metal instead of resin because the resin is expensive, has low electrical characteristics due to its low resistivity, and generates contamination by impurity of the particle source. The light-shielding layer 129 is formed of at least one of chrome Cr, molybdenum Mo, copper Cu, tantalum Ta and aluminum Al. Furthermore, an oxide layer 129a may be formed on the light-shielding layer 129 to decrease the reflection of the external light. The oxide layer 129a may be formed in an anodic oxidation method of the light-shielding layer, or an additional deposition process.

When forming the common electrode 130b above the data line 124, the common electrode 130b covers the portion corresponding to the interval between the respective color filter layers; otherwise, the white light transmits without passing through the color filter layer 126 as the light passes through the color filter layer by driving the liquid crystal from the edge of the common electrode 130b to the edge of the pixel electrode 130c, thereby deteriorating the color purity. However, as the interval is increased between the color filter layers, it is disadvantageous to an aperture ratio. Accordingly, it is required to determine the optimal dimension based upon the relationship between the color purity and the aperture ratio. Also, an upper substrate 110 formed opposite to the lower substrate 120. The upper substrate 110 includes an alignment layer (not shown) without the color filter layer and the black matrix layer in that the gate line 121, the data line 124, the second common line 130a above the channel region of the thin film transistor, the common electrode 130b and the light-shielding layer 129 serve as the black matrix layer. Also, the island-shaped light-shielding layer 129 may be formed on the upper substrate 100 corresponding to the channel region of the thin film transistor of the lower substrate 120, thereby preventing light incidence.

Figure 14A:
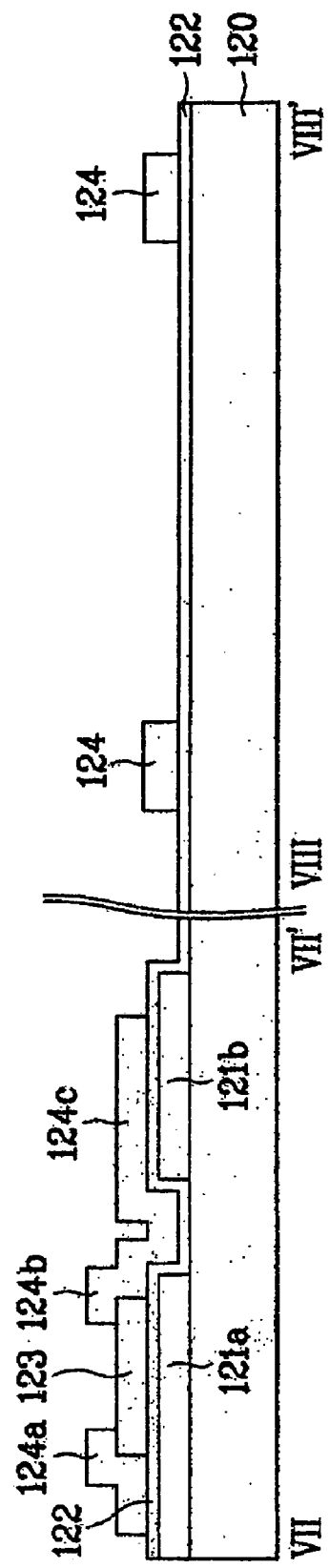
FIG. 14A to FIG. 14C are cross-sectional view illustrating manufacturing process steps of an LCD device according to an embodiment of the present invention.
Figure 14B:
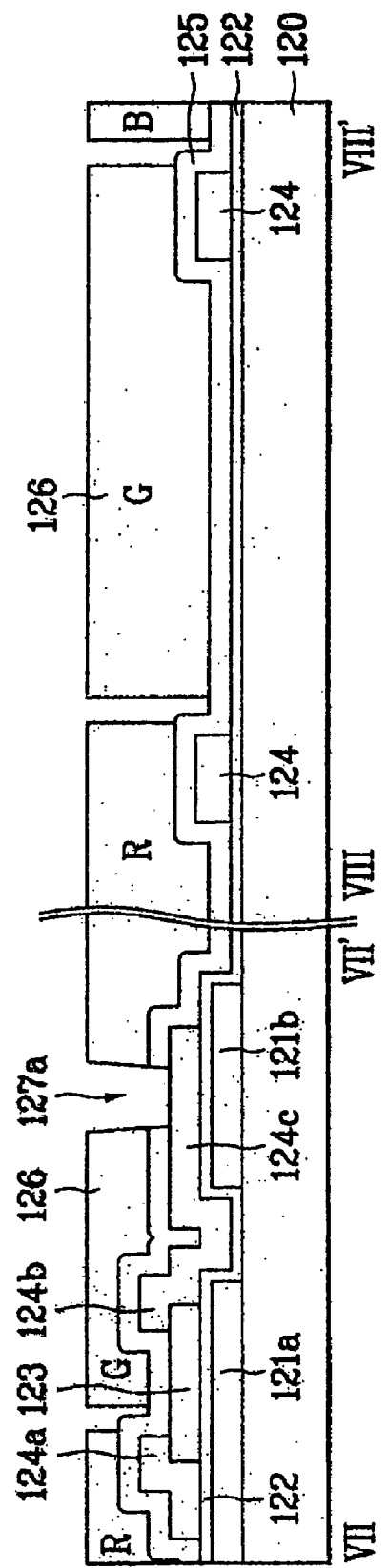
Figure 14C:
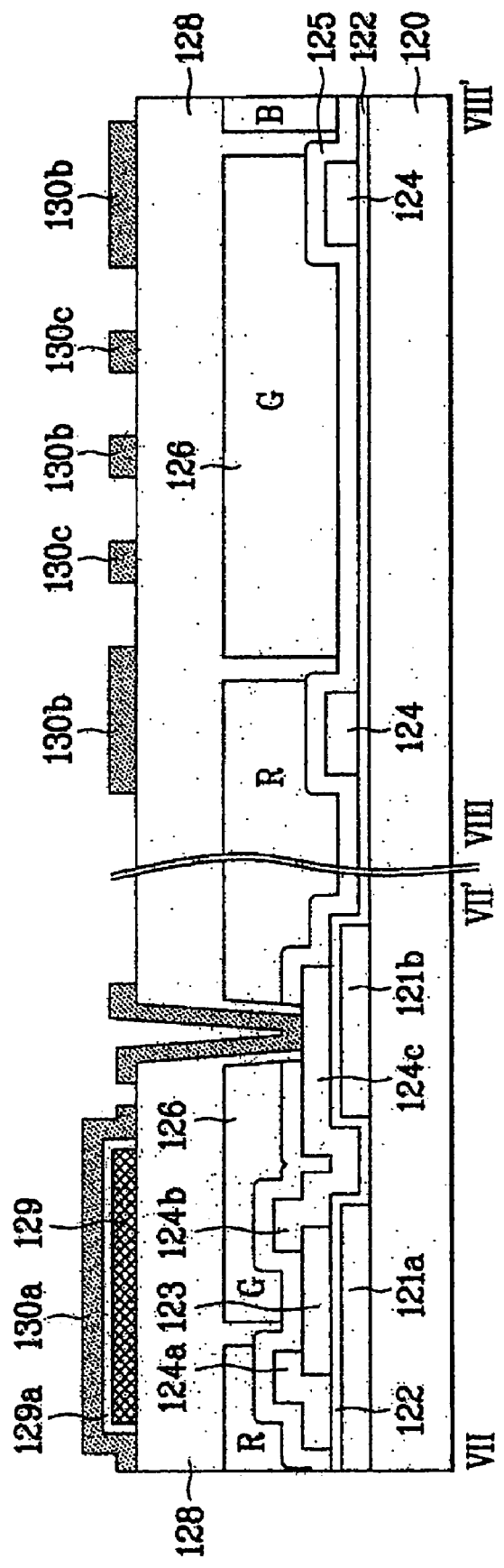

A method for manufacturing the LCD device according to an embodiment of the present invention will be described with reference to the accompanying drawings. FIG. 14A to FIG. 14C are cross-sectional views illustrating the manufacturing process of the LCD device according to an embodiment of the present invention.

As shown in FIG. 12 and FIG. 14A, a conductive metal material is deposited on the transparent lower substrate 120, and the patterned by photolithography, thereby forming the gate line 121 having a gate pad (not shown) and the gate electrode 121a. Simultaneously, the first common line 121b is formed on the same layer and parallel to the gate line 121. After that, the gate insulating layer 122 is formed on an entire surface of the lower substrate 120 including the gate line 121 and the first common line 121b. The gate insulating layer 122 is formed of $SiN_x$ or $SiO_x$. Then, a semiconductor layer (e.g., 'amorphous silicon'+'impurity amorphous silicon') is formed on the gate insulating layer 122, and patterned by photolithography, thereby forming the island-shaped active layer 123 above the gate electrode 121a. Next, a conductive metal material is deposited on the entire surface of the lower substrate 120 including the active layer 123, and then patterned by photolithography, thereby simultaneously forming the data line 124 perpendicular to the gate line 121, the source electrode 124a protruding from the data line 124, and the drain electrode 124b at a predetermined interval from the source electrode 124a. The storage electrode 124c extending from the drain electrode 124b is formed above the first common line 121b, thereby obtaining the Storage On Common structure.

As shown in FIG. 12 and FIG. 14B, the insulating interlayer 125 is formed on the entire surface of the lower substrate 120 including the data line 124. The insulating interlayer 125 is formed of an oxide layer or a nitride layer. After that, the R/G/B color filter layers 126 are formed in the respective pixel regions. The respective color filter layers 126 completely overlap the data lines 124. Each color filter layer 126 is increased by a predetermined width in one portion corresponding to one side of the data line 124, whereby the data line 124 is completely covered with each color filter layer 126. Also, the respective R/G/B color filter layers 126 are formed at fixed intervals to obtain the flatness on the entire surface of the substrate. Then, the color filter layer 126 and the insulating interlayer 125 are selectively etched, thereby forming the first and second contact holes 127a and 127b to expose the predetermined portion of the drain electrode 124b and the predetermined portion of the first common line 121b.

As shown in FIG. 12 and FIG. 14C, the insulating layer 128 is formed on the color filter layer 126 to flatten the surface of the lower substrate 120. The insulating layer 128 is formed of at least one of photoacryl, polyimide, and BCB (BenzoCycloButene). By etching the insulating layer 128, the contact holes are formed to expose the predetermined portions of the drain electrode 124b or the storage electrode 124c extending therefrom, and the first common line 121b. Alternatively, after forming the insulating layer 128, the insulating layer 128, the color filter layer 126, the insulating interlayer 125 and the gate insulating layer 122 may be sequentially etched to expose the predetermined portions of the drain electrode 124b and the first common line 121b, thereby forming the first and second contact holes 127a and 127b. Subsequently, a metal layer is deposited on the insulating layer 128, and then patterned by photolithography, thereby forming the light-shielding layer 129 above the channel region of the thin film transistor. The light-shielding layer 129 is formed of at least one of chrome Cr, molybdenum Mo, copper Cu, tantalum Ta, and aluminum Al. Furthermore, the oxide layer 129a is additionally formed on the light-shielding layer 129. The oxide layer 129a may be formed using a heat treatment on the metal layer, or by depositing a transparent conductive layer for the common electrode and the pixel electrode in the oxygen atmosphere. After that, a transparent conductive layer is deposited on the insulating layer 128 including the light-shielding layer 129, and then selectively removed by photolithography, thereby forming the second common line 130a, the common electrode 130b, and the pixel electrode 130c. The second common line 130a overlaps the gate line 121 and the thin film transistor. Also, the common electrode 130b is formed as one body with the second common line 130a. The common electrode 130b is formed to cover the data line 124 completely, and the common electrode 130b extending from the second common line 130a is formed at one direction in the pixel region.

To prevent the voltage of the data line 124 from effecting the voltage of the pixel electrode 130c, the common electrode 130b overlaps the data line 124 by a predetermined margin at the left side, and a predetermined margin for accuracy of the color filter layers corresponding to the interval between the color filter layers 126 at the right side. The margin of the right side is greater than the margin of the left side, whereby the right and left sides of the common electrode 130b are asymmetrically formed above the data line 124. The margin of the color filter layer 126 may be controlled based upon the allowable reflection extent of the external light. The margin corresponding to the interval between the color filter layers 126 may be controlled based upon the planarization level.

When forming the common electrode 130b above the data line 124, the common electrode 130b covers the portion corresponding to the interval between the respective color filter layers 126; otherwise, the white light transmits without passing through the color filter layer 126 as the light passes through the color filter layer by driving the liquid crystal from the edge of the common electrode 130b to the edge of the pixel electrode 130c, thereby deteriorating the color purity. However, as the interval is increased between the color filter layers 126, it is disadvantageous to an aperture ratio. Accordingly, it is required to determine the optimal dimension based upon the relationship between the color purity and the aperture ratio. Also, the common electrode 130b is formed parallel to the data line 124 in one direction within the pixel region, and one end of the common electrode 130b overlaps the first common line 121b.

In the aforementioned LCD device, the pixel electrode 130c is connected to the drain electrode 124b through the first contact hole 127a, and the second common line 130a is connected with the first common line 121b through the second contact hole 127b. The transparent conductive layer is formed of indium-tin-oxide (ITO), tin-oxide (TO), indium-zinc-oxide (IZO), or indium-tin-zinc-oxide (ITZO) or the like. Although not shown, the alignment layer (not shown) of polyimide or photosensitive material is formed on the entire surface of the lower substrate 120 including the second common line 130a, the common electrode 130b and the pixel electrode 130c. If the alignment layer is formed of polyimide, the alignment direction is determined by mechanical rubbing. Meanwhile, if the alignment layer is formed of the photosensitive material such as polyvinylcinnamate(PVCN)-based material or polysiloxane-based material, the alignment direction is determined by irradiation of ultraviolet rays. At this time, the alignment direction depends on light irradiation direction or light characteristics such as polarizing direction. After that, the upper substrate 110 is prepared, and a sealant (not shown) is formed on any one of the lower and upper substrates 120 and 110. Then, the lower and upper substrates 120 and 110 are bonded to each other. Although not shown, the same alignment layer is formed on the entire surface of the upper substrate 110.

As mentioned above, the LCD device according to the present invention and the method for manufacturing the same has the following advantages.

First, the color filter layer and the common electrode are formed to cover the data line completely, so that it is possible to decrease the reflection of the external light above the data line, thereby improving the picture quality. Also, the light-shielding layer is formed of metal instead of resin, thereby improving the price of the LCD and its electrical characteristics. Furthermore, the LCD device according to the present invention obtains the COT structure of forming the color filter layer on the lower substrate, and the light-shielding layer to completely cover the channel region of the thin film transistor so that it is possible to solve problems such as the decrease of the aperture ratio due to the margin for bonding the lower and upper substrates to each other.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display (LCD) device comprising:
    first and second substrates facing each other;
    gate and data lines crossing each other on the first substrate to define a pixel region, wherein the data lines is formed in a straight line;
    a first common line parallel to the gate line;
    a thin film transistor at a crossing portion of the gate and data lines;
    an insulating interlayer on an entire surface of the first substrate including the data line;
    color filters on the first substrate in the pixel region, wherein each color filter does not overlap each other, and completely overlaps only one of the adjacent two data lines so that a fixed interval between the color filter layers is not disposed on the data line;
    a planarization layer on the entire surface of the first substrate including the color filter layers;
    a second common line along the gate line and the thin film transistor;
    common electrodes completely overlapping the data line and extending to a portion between respective color filters, wherein the common electrodes are arranged in one direction in the pixel region; and
    a pixel electrode in contact with a drain electrode of the thin film transistor and formed between the common electrodes at fixed intervals,
    wherein the common electrodes are wider than the data line, and are formed in an asymmetric structure with respect to a portion of the common electrodes on a left side of the data line and a portion of the common electrodes corresponding to and covering the fixed interval between the color filter layers.

2. The LCD device of claim 1, wherein the color filter layers are formed at fixed intervals, each color filter layer being increased a predetermined width on one side of the data line.

3. The LCD device of claim 1, wherein the common electrodes of the pixel region are formed parallel to the data line.

4. The LCD device of claim 1, wherein the common electrodes are formed as one body with the second common line.

5. The LCD device of claim 1, wherein the second common line, the common electrodes and the pixel electrode are formed on the same layer.

6. The LCD device of claim 1, wherein the second common line, the common electrode and the pixel electrode are formed of indium-tin-oxide (ITO), tin-oxide (TO), indium-zinc-oxide (IZO), or indium-tin-zinc-oxide (ITZO).

7. The LCD device of claim 1, further comprising a light-shielding layer on the planarization layer above a channel region of the thin film transistor.

8. The LCD device of claim 7, wherein the light-shielding layer is formed of at least one of chrome Cr, molybdenum Mo, copper Cu, tantalum Ta and aluminum Al.

9. The LCD device of claim 7, wherein an oxide layer is formed on the surface of the light-shielding layer to decrease a reflection of external light.

10. The LCD device of claim 1, further comprising a black matrix layer on the second substrate, the black matrix layer corresponding to a channel region of the thin film transistor of the first substrate.

11. The LCD device of claim 1, wherein the first common line is formed on a same layer as the gate line.

12. The LCD device of claim 1, wherein a storage electrode extending from the drain electrode is formed on a gate insulating layer above the first common line.

13. The LCD device of claim 1, wherein the planarization layer is formed of at least one of photoacryl, polyimide, and BCB (BenzoCycloButene).

14. The LCD device of claim 1, further comprising a first contact hole on one portion of the drain electrode, and a second contact hole on one portion of the first common line.

15. The LCD device of claim 14, wherein the second common line is in contact with the first common line through the second contact hole within the pixel region.

16. The LCD device of claim 14, wherein the pixel electrode is in contact with the drain electrode through the first contact hole.

* * * * *